United States Patent [19]

Kobayashi et al.

[11] 3,825,950

[45] July 23, 1974

[54] MAGNETIC CARD READER-RECORDER

[75] Inventors: Hiromasa Kobayashi; Yuzo Oguchi; Kazuhiko Nakata, all of Suwa-gun, Nagano-ken, Japan

[73] Assignee: Kabushiki Kaisha Sankyo Seiki Seisakusho, Nagano-ken, Japan

[22] Filed: Nov. 17, 1972

[21] Appl. No.: 307,513

[30] Foreign Application Priority Data

Nov. 24, 1971 Japan .............................. 46-94313

[52] U.S. Cl. ................................................ 360/109

[51] Int. Cl. ............................................ G11b 5/56

[58] Field of Search ............... 271/52; 235/61.12 M; 179/100.2 CA; 340/174.1 F

[56] References Cited

UNITED STATES PATENTS

| | | | |
|---|---|---|---|
| 2,672,337 | 3/1954 | Lorig et al. | 271/52 |
| 3,175,824 | 3/1965 | Albostz | 271/52 |
| 3,550,741 | 12/1970 | Sherman | 271/52 |
| 3,550,933 | 12/1970 | Wilson | 271/52 |

*Primary Examiner*—Vincent P. Canney
*Attorney, Agent, or Firm*—McGlew and Tuttle

[57] ABSTRACT

The apparatus comprises a card positioning member for correctly positioning a magnetic card in its movement along its path of travel adjustable in its position relative to the path of travel of the card. By adjusting the position of the card positioning member in accordance with the size and type of the magnetic card to be handled, it is possible to bring the magnetic tracks on the card into alignment with the magnetic head and cause the magnetic tracks to be correctly oriented relative to the magnetic gap of the magnetic head when the card moves along its path of travel while being maintained in pressing engagement with the card positioning member, whereby information can be magnetically recorded on the card or the information carried by the card can be magnetically read.

11 Claims, 7 Drawing Figures

MAGNETIC CARD READER-RECORDER

BACKGROUND OF THE INVENTION

This invention relates to a magnetic card reader-recorder adapted to magnetically record information on a card, such for example as an I.D. card, driver's license, railway season ticket, or the like, and to read out the information carried by such card.

In magnetic card reader-recorders of the type in which a magnetic card is permitted to move along its path of travel and information is magnetically recorded thereon, or the information carried thereby is read by means of magnetic head, it is required to bring the magnetic head and a magnetic tracks on the magnetic card into alignment with each other and to orient the magnetic tracks on the magnetic card at right angles to the magnetic gaps of the magnetic head. In apparatus of this type, an adjusting operation for bringing the magnetic tracks on the magnetic card into alignment with the magnetic head is generally referred to as a "tracking adjustment" and an adjusting operation for orienting the magnetic tracks on the magnetic card at right angles to the magnetic gap of the magnetic head is generally referred to as a "skew correction." These operations are very important. Particularly when magnetic cards used with the reader-recorder vary in size and in the position of tracks on the card, tracking adjustment and skew correction must be performed by all means so as to conform the apparatus to the type of card to be handled. Apparatus having no means for effecting such adjustment and correction may be said to be low in utility.

In one type of means known in the art for effecting tracking adjustment and skew correction of magnetic card reader-recorders, the magnetic head is firmly secured to a frame which is adjustably mounted on a guide frame formed on opposite sides thereof with magnetic card guide walls, and adjusting screws are loosely connected to the guide walls of the guide frame in front and rear portions thereof so that the heads of the screws are in engagement with opposite side surfaces of the magnetic head mounting frame, so that the magnetic head mounting frame can be moved by adjusting the positions of the adjusting screws to adjust the position of the magnetic head.

However, some disadvantages are associated with the aforementioned adjusting means. In performing tracking adjustment and skew correction operations, corresponding pairs of adjusting screws of the four adjusting screws connected to the guide walls must be manipulated simultaneously. This requires a skill in operation. Moreover, since the magnetic head mounting frame and guide frame are formed separately and independently, a situation may arise wherein the two frames, after being assembled following adjustment of the position of the magnetic head, must be disassembled again due to some other undesirable conditions requiring adjustments being found in the final check-up. In such case, the frames must be disassembled and the tracking adjustment and skew correction operations must be performed again before assembling the frames. Another disadvantage lies in the fact that care should be exercised in maintaining the machining of the guide walls at a high level.

SUMMARY OF THE INVENTION

The present invention obviates the aforementioned disadvantages of the prior art. The invention has as its object the provision of a magnetic card reader-printer of the type which permits tracking adjustment and skew correction operations to be performed readily and quickly, and which is constructed such that the need to effect such readjustment and correction is eliminated even if the upper and lower frames are disassembled again after tracking and skew adjustments have once been performed.

The aforementioned object is accomplished according to the invention by providing a reference member or card positioning member disposed on one side of the path of movement of magnetic cards. Each card is permitted to move along the path of travel while being maintained in pressing engagement with the card positioning member which is mounted on the magnetic head supporting frame and capable of having its position adjusted with respect to the frame.

According to the invention, the card positioning member for regulating the position of the magnetic card on its path of travel is adjustably mounted on the magnetic card supporting frame, and the position of the card positioning member can be readily adjusted by successively adjusting two adjusting members only. Thus, both tracking adjustment and skew correction can be effected simultaneously and quickly. Moreover, once adjustments are effected, the need to effect readjustments is eliminated even if the upper and lower frames have to be disassembled and assembled again after the adjustments are effected.

The magnetic card reader-recorder according to the invention permits the position of the card positioning member to be readily adjusted. Thus, the apparatus can be made to conform readily to any type and size of magnetic cards and its utility is increased.

DESCRIPTION OF PREFERRED EMBODIMENTS

Figure 1:
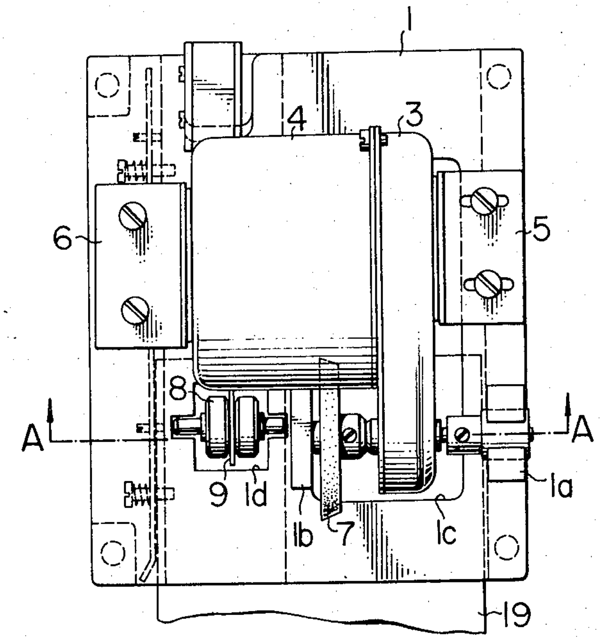
FIG. 1 is a plan view of the magnetic card reader-recorder comprising one embodiment of the invention.
Figure 2:
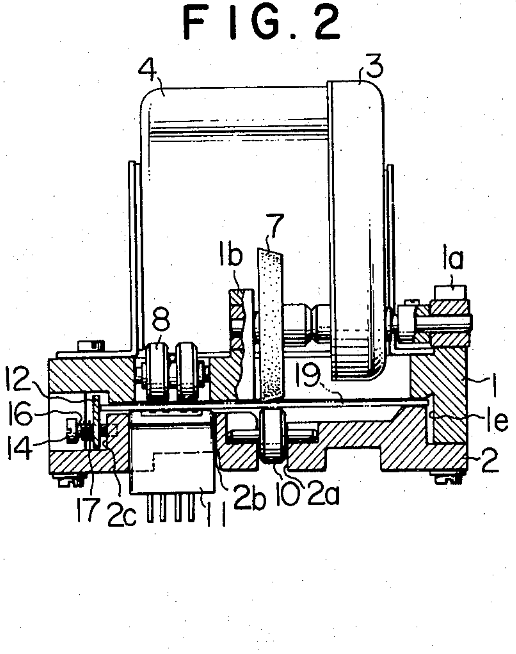
FIG. 2 is a sectional view taken along the line A–A' of FIG. 1.
Figure 3:
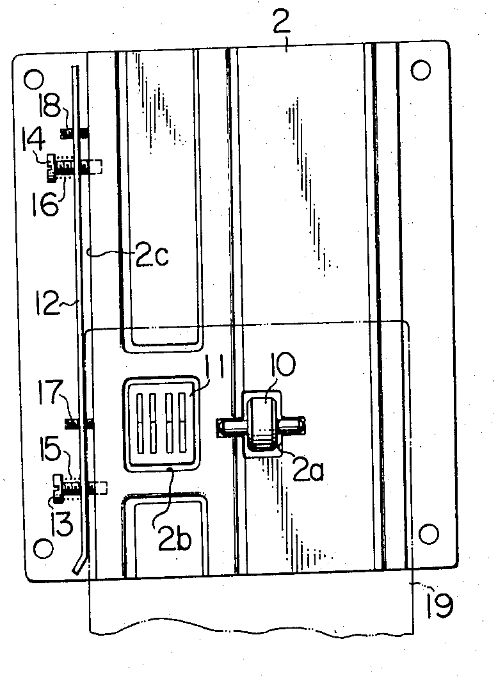
FIG. 3 is a plan view of the apparatus shown in FIG. 1 with its upper frame being removed.

In the embodiment shown in FIG. 1 to FIG. 3, a set of frames 1 and 2 are disposed one above the other, and a drive motor 4 having a speed reducing gear box 3 is disposed on frame 1 and held in position on opposite sides thereof by L-shaped side plates 5 and 6. A capstan roller 7 is connected to an output shaft of gear box 3 which is rotatably supported by walls 1a and 1b on upper frame 1. Capstan roller 7 is a frusto-conical roller having one portion extending through a window 1c formed in upper frame 1 and disposed above a path of travel of cards defined between frames 1 and 2.

As subsequently to be described, capstan roller 7 engages and acts on a magnetic card 19 on its path of travel to move the same on the path and to cause the card to deflect to one side of the path in its movement without moving straight ahead. Pat rollers 8 are rotatably disposed in a window 1*d* formed in upper frame 1 in side-by-side relation to window 1c and urged by a coil spring 9 to move magnetic card 1 into pressing engagement with a magnetic head 11 presently to be described.

A pinch roller 10 adapted to engage capstan roller 7 is rotatably disposed in a window 2*a* formed in lower frame 2. Magnetic head 11 is fixed in another window 2*b* and has a plurality of magnetic operation gaps disposed in face-to-face relation to pat rollers 8. Magnetic head 11 is mounted in window 2*b* and fixed therein as by an adhesive agent after the mounting angle is adjusted by means of a jig to bring the plurality of operation gaps into full engagement with the recording surface of magnetic card 19.

When drive motor 4 rotates in the apparatus constructed as aforementioned, capstan roller 7 also rotates and the magnetic card 19 inserted between capstan roller 7 and pinch roller 10 is moved along its path of movement. Capstan roller 7 is a frusto-conical roller and may be made of a hard material, such as metal or hard rubber, or a soft material, such as raw rubber or semi-hard rubber. When magnetic card 19 is held between frusto-conical capstan roller 7 and pinch roller 10, the pinch roller urges the magnetic card to be deflected to the right in FIG. 1 when, the pinch roller is made of a hard material, and the pinch roller is deformed such that its maximum diameter portion bulges outwardly, when it is made of a soft material, so that the magnetic card is urged to be deflected to the left in FIG. 1. In the description set forth hereinafter, the pinch roller is described as being made of a soft material.

Upper and lower frames 1 and 2 are fixed to each other by threadably connecting them together at four corners by means of screws, and a guide wall 1e is formed integrally at the right side of upper frame 1. However, no guide wall is formed at the side opposite to guide wall 1e or the side toward which card 19 is deflected by pinch roller 7 in its movement along its path of travel. A planar reference or card positioning member 12, adapted to be engaged by one side of magnetic card 19 deflected in its movement, is provided in a gap formed between upper and lower frames at the left sides thereof, and arranged with its major axis aligned with the direction of the path of travel of the card.

As shown in FIG. 3, card positioning member 12 is supported by guide members 13 and 14 loosely extending through at least two portions of the member 12, for example, front and rear portions of the member 12, and threadably connected to magnetic head supporting lower frame 2, and member 12 is urged by the biasing forces of compression springs 15 and 16, mounted on guide members 13 and 14, respectively, to move toward side wall 2*c*. Adjusting screws 17 and 18 are engaged through card positioning member 12 in a position in which member 12 is juxtaposed to the plurality of operation gaps of magnetic head 11 and in a position in which member 12 is disposed as remote as possible from the operation gaps respectively. The front ends of adjusting screws 17 and 18 engage the side wall 2*c* of lower frame 2.

It will thus be seen that card positioning member 12 can be made to move forwardly or rearwardly relative to lower frame 2 by turning screws 17 and 18, so that the angle and position of card positioning member 12 can be suitably adjusted. By this arrangement, magnetic card 19, which is caused to be deflected to the left by capstan roller 7 while moving along its path, can be made to move along its path of movement while being maintained in engagement with card positioning member 12. This permits the position of magnetic card 18 on its path of travel to be determined by card positioning member 12. Since card positioning member 12 is mounted on lower frame 2 to which magnetic head 11 is secured, tracking of magnetic head 11 with respect to magnetic card 19 can be adjusted and skew of the former with respect to the latter can be corrected by adjusting the angle and position of card positioning member 12.

More specifically, if one adjusting screw 17, disposed in a position in which it is juxtaposed to the operation gaps of magnetic head 11, is adjusted, the magnetic head can be correctly positioned relative to the magnetic tracks on the magnetic card. If the other adjusting screw 18 is adjusted after tracking adjustment is effected as aforementioned, skew of the operation gaps of the magnetic head relative to the direction of movement of the magnetic card can be corrected or the operation gaps of the magnetic head can be arranged correctly at right angles to the path of movement of the magnetic card, because card positioning member 12 can be pivoted about the point of contact between adjusting screw 17 and side wall 2c.

In effecting tracking adjustment and skew correction by means of adjusting screws 17 and 18 in actual practice, a master card formed thereon with a plurality of magnetic tracks recorded therein with signals of the same phase is moved on trial, and the output power of magnetic head 11 may be studied, as by an oscilloscope while, adjusting screw 17, so that the output power from each track can be maximized. Then, adjusting screw 18 may be adjusted such that the output powers from the tracks are brought to the same phase.

From the foregoing description, it will be appreciated that magnetic card 19 moves along its path of movement while being caused to be deflected toward card positioning member 12, into pressing engagement therewith by capstan roller 7. Thus, the guide wall 1e shown at the right side of frame 1 is not essential and may be omitted. For causing magnetic card 19 to be deflected into engagement with card positioning member 12, other means than frusto-conical capstan roller 7 may be employed. Such means may, for example, be a roller of the ordinary type with no inclined periphery arranged such that a shaft supporting the roller is inclined with respect to the direction of movement of the card. Alternatively, such means may be a pin projecting sideways from one wall into the path of travel of the card and adapted to cause the card to press against the card positioning member while an ordinary roller is used as the capstan roller for driving the card and rotated in a normal manner. The card positioning member is disposed at the side to which the card is deflected in its movement.

Figure 4:
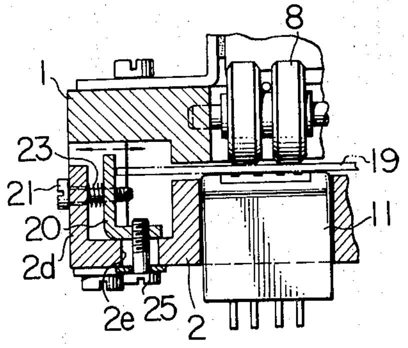
FIG. 4 and FIG. 5 are sectional views of essential portions of another embodiment of the invention.

FIG. 4 shows another embodiment of the invention in which a modified form of card positioning member 20, of L-shaped cross-sectional form, is employed in place of planar card positioning member 12. L-shaped card positioning member 20 is arranged parallel to a side wall 2*d* disposed on the leftmost end of lower frame 2 and parallel to the path of movement of the card. Adjusting screws 21 and 22 (not shown) are inserted through side wall 2*d* in positions corresponding to the adjusting screws 17 and 18 of the first embodiment, and threaded into card positioning member 20 after compression springs 23 and 24 (not shown) are mounted on screws 21 and 22 respectively.

On the other hand, openings 2*e* and 2*f* (not shown) are formed in the front and rear of the bottom wall of lower frame 2 for receiving therein, through washers, fixing screws 25 and 26 (not shown), respectively, which are threaded into threaded openings formed in the bottom leg of card positioning member 20.

Openings 2*e* and 2*f* have a diameter substantially greater than that of fixing screws 25 and 26. Thus, by adjusting screws 21 and 22 while fixing screws 25 and 26 are loosened, it is possible to move card positioning member 20 forwardly and backwardly relative to adjusting screws 21 and 22 as is the case with the first embodiment, so that it is possible to effect tracking adjustment and skew correction of the magnetic head. If fixing screws 25 and 26 are tightened after effecting adjustment and correction, card positioning member 20 can be firmly fixed to lower frame 2.

Figure 5:
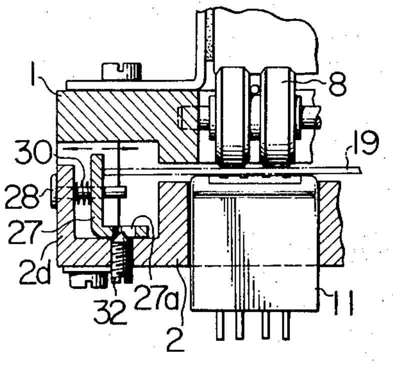

FIG. 5 shows another means for adjusting the card positioning means of L-shaped cross-section. As shown, a card positioning member 27 of L-shaped cross-section is loosely supported by guide pins 28 and 29 (not shown) force fitted and fixed in openings formed in side wall 2d of lower frame 2, and compression springs 30 and 31 (not shown) are mounted on guide pins 28 and 29, respectively, so as to urge card positioning member 27 to move toward the path of movement of the magnetic card by the biasing forces of springs 30 and 31. Adjusting screws 32 and 33 (not shown) are threaded into the bottom wall of frame 2 in positions corresponding to adjusting screws 17 and 18 of the first embodiment shown in FIG. 3, and the tapering conical surfaces of the front end portions of screws 32 and 33 are maintained in engagement with the edges of openings 27*a* and 27*b* (not shown), respectively, formed in the bottom leg of card positioning member 27. Preferably, openings 27*a* and 27*b* have a diameter which is substantially the same as the diameter of adjusting screws 32 and 33.

Thus, the end edges of openings 27*a* and 27*b* are urged by the biasing forces of compression springs 30 and 31 into engagement with the tapering front end portions of adjusting screws 32 and 33 at all times. By this arrangement, it is possible to move card positioning member 27 in the directions of the arrows in FIG. 5 by adjusting screws 32 and 33 and causing the same to move forwardly or backwardly relative to lower frame 2. Thus, tracking adjustment and skew correction can be effected in the same manner by this adjusting means as by the previously described adjusting means. By using means similar to the fixing screws 25 and 26 of the embodiment shown in FIG. 4, it is possible to firmly fix card positioning member 27 to the lower frame.

The embodiments described above are similar to one another in that the card positioning member is adjustably mounted on the frame to which the magnetic head is fixed. It is to be understood that the invention is not limited to the planar shape of card positioning member as shown and described, and that the card positioning member may be of any form as desired. For example, similar results can be obtained by using a card positioning member of block shape having a rectangular cross-section. If necessary, an L-shaped member similar to the L-shaped card positioning member shown in FIG. 4 or FIG. 5 may be mounted at the left side and right side of the path of movement of the magnetic card, and the opposite walls may be formed integrally with a bottom plate. In using all these forms of card positioning member, it is to be understood that tracking adjustment and skew correction are effected by the card positioning member disposed at the side toward which the magnetic card is deflected without moving straight ahead.

Figure 6:
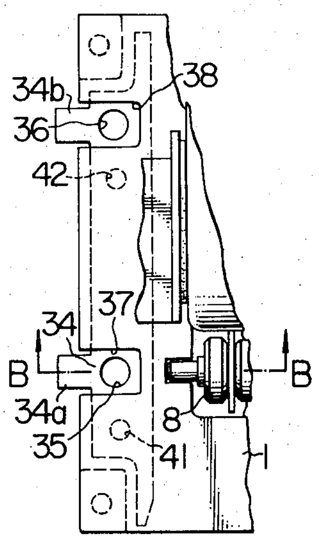
FIG. 6 is a plan view of essential portions of still another embodiment of the invention.
Figure 7:
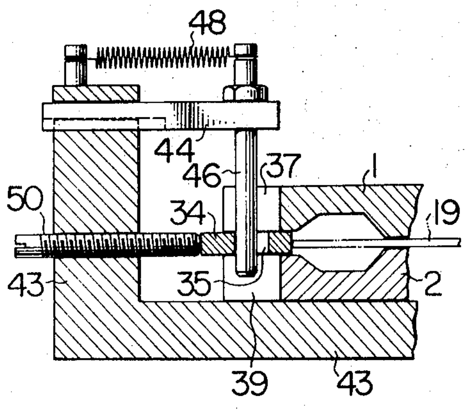
FIG. 7 is a sectional view taken along the line B–B' of FIG. 6 and showing jigs being applied to the embodiment shown in FIG. 6.

The embodiment shown in FIG. 6 and FIG. 7 represents a modification of the embodiments shown and described above. The card positioning member shown in these figures, which performs the same function as its counterparts described above, is adapted to have its position adjusted from outside by using jigs.

As shown, a planar card positioning member 34 is slidably mounted between upper and lower frames 1 and 2, and cutouts 37, 38, 39 and 40 (are not shown) are formed in the two frames in positions at end portions of the frames which are juxtaposed to the operation gaps of the magnetic head and in positions as much remote as possible from these positions. Openings 35 and 36 are formed in card positioning member 34 in positions corresponding to the aforementioned cutouts 37 and 38.

On the other hand, horizontally slidable arms 44 and 45 (only 44 being shown) are mounted in the upper portion of an L-shaped base 43 which supports on its bottom wall upper and lower frames 1 and 2 as shown in FIG. 7. Detachable guide pins 46 and 47 (only 46 being shown) extend vertically through the front end portions of arms 44 and 45 respectively, and coil springs 48 and 49 (only 48 being shown) are mounted between base 43 and guide pins 46 and 47 respectively, so as to urge guide pins 46 and 47 to move leftwardly, in FIG. 7, by the biasing forces of springs 48 and 49. Adjusting screws 50 and 51 (not shown), serving as jigs, are inserted in horizontal openings formed in the upright leg of base 43 for sliding motion relative to base 43.

After upper and lower frames 1 and 2 are placed on base 43 in a predetermined position and secured therein, guide pins 46 and 47 are inserted in openings 35 and 36, respectively, formed in card positioning member 34 and in cutouts 37, 38, 39 and 40. By this arrangement, guide pins 45 and 46 cause card positioning member 34 to be deflected leftwardly in FIG. 7 by the biasing forces of coil springs 48 and 49, with a result that lateral projections 34*a* and 34*b* from member 34 abut against the front ends of adjusting screws 50 and 51, respectively.

Thus, if adjusting screw 50 or 51 is adjusted and moved forwardly or rearwardly, then card positioning member 34 also moves in slaved relationship, permitting tracking adjustment and skew correction to be effected in the same manner as in the embodiments described above. By threadably inserting from the lower frame side fixing screws (not shown) similar to the fixing screws 25 and 26 shown in the embodiment of FIG. 4 in threaded openings 41 and 42 formed in card positioning member 34 and tightening the same, it is possible to firmly clamp card positioning member 34 to lower frame 2 to which the magnetic head is fixed. Then, the jigs are removed from base 43.

The jigs used in the embodiment just described are constructed to urge the card positioning member to move way from the upper and lowr frames or from the path of movement of the card. It is to be understood, however, that the jigs may be constructed to urge the card positioning member to move toward the upper and lower frames.

Either one of the adjusting screws is preferably disposed in a portion of the card positioning member which corresponds to a position in which the magnetic head is fixed to the lower frame.

What is claimed is:

1. A magnetic card reader-recorder comprising an upper frame and a lower frame defining a path of movement of a magnetic card therebetween, card moving means for moving the magnetic card along said path of movement while deflecting the card to one side of the path, a magnetic head fixed to one of said upper frame and said lower frame and adapted either to magnetically read the information carried by the magnetic card or to magnetically record information on the magnetic card, a card positioning member mounted on said one frame to which said magnetic head is secured and disposed on that edge of said one frame to which the magnetic card is deflected during its movement along its path of movement for accurately positioning the magnetic card on its path of movement, and a pair of longitudinally spaced adjusting means engaged between said card positioning member and said one frame for adjusting said card positioning member relative to said one frame; one adjusting means being located laterally adjacent said magnetic head for setting the lateral location of the card relative to said magnetic head, for tracking adjustment of a card, and the other adjusting means being spaced longitudinally from said magnetic head for setting the angular orientation of a card relative to said magnetic head, for skew correction of a card.

2. A magnetic card reader-recorder as set forth in claim 1 wherein said card moving means comprises a frusto-conical roller made of a soft material and arranged such that its major diameter peripheral edge faces the edge of said one frame on which said card positioning member is disposed.

3. A magnetic card reader-recorder as set forth in claim 1 wherein said card moving means comprises a frusto-conical roller made of a hard material and arranged such that its minor diameter peripheral edge faces the edge of said one frame on which said card positioning member is disposed.

4. A magnetic card reader-recorder as set forth in claim 1 wherein said card positioning member is an elongated plate.

5. A magnetic card reader-recorder as set forth in claim 1 wherein said card positioning member is an elongated plate of L-shaped cross-section.

6. A magnetic card reader-recorder as set forth in claim 1 wherein said card positioning member is a bar.

7. A magnetic card reader-recorder as set forth in claim 1 wherein said card positioning member adjusting means comprises adjusting screws for correctly positioning the card positioning member with respect to said one frame on which the magnetic head is mounted, and guides for holding in position the card positioning member after the latter is correctly positioned.

8. A magnetic card reader-recorder as set forth in claim 4 wherein said plate is held in position at one side of the path of movement of the magnetic card by card positioning member adjusting means comprising adjusting screws threaded into two portions of the plate and each having a front end positioned against the frame to which the magnetic head is fixed, guides connected to two portions of the plate and threaded into the frame to which the magnetic head is secured, and at least one spring adapted to urge the front ends of said adjusting screws into engagement with the frame to which the magnetic head is secured.

9. A magnetic card reader-recorder as set forth in claim 5 wherein said plate is held in position at one side of the path of movement of the magnetic card by card positioning member adjusting means comprising adjusting screws threadably connected to two portions of the vertical member of the plate and loosely inserted in the frame to which the magnetic head is secured, fixing screws loosely inserted in the frame to which the magnetic head is secured and threadably connected to two portions of the horizontal member of the plate, and at least one spring adapted to bias the plate relative to the frame to which the magnetic head is secured.

10. A magnetic card reader-recorder as set forth in claim 5 wherein the plate is held in position at one side of the path of movement of the magnetic card by card positioning member adjusting means comprising guide members threadably connected to two portions of the vertical member of the plate and loosely inserted in the frame to which the magnetic head is secured, adjusting screws threadably connected to the frame to which the magnetic head is secured and each having a conical front end portion, said conical front end portions of said adjusting screws being maintained in engagement with two portions of the horizontal member of the plate, and at least one spring adapted to bias the plate relative to said adjusting screws by its biasing force.

11. A magnetic card reader-recorder as set forth in claim 6 wherein said bar is held in position at one side of the path of movement of the magnetic card by card positioning member adjusting means comprising a pair of arms supporting the block and mounted on a base for sliding motion toward or away from the frame to which the magnetic head is secured, adjusting screws threadably connected to two portions of the base and adapted to adjust the bar relative to the path of movement of the magnetic card, and at least one spring adapted to bias the bar to engage said arms with said adjusting screws.

* * * * *